(12) United States Patent
Okawa et al.

(10) Patent No.: US 6,265,516 B1
(45) Date of Patent: Jul. 24, 2001

(54) ANTI-STAINING ADDITIVE AND ROOM-TEMPERATURE-CURABLE POLYORGANOSILOXANE COMPOSITION

(75) Inventors: Tadashi Okawa; Wataru Nishiumi; Seiji Hori, all of Chiba Prefecture (JP)

(73) Assignee: Dow Corning Toray Silicone Company, Ltd.

( * ) Notice: Subject to any disclaimer, the term of this patent is extended or adjusted under 35 U.S.C. 154(b) by 0 days.

(21) Appl. No.: 09/507,716

(22) Filed: Feb. 18, 2000

(30) Foreign Application Priority Data

Feb. 26, 1999 (JP) .................................................. 11-051014

(51) Int. Cl.[7] .................................................. C08G 77/14
(52) U.S. Cl. .................. 528/26; 528/31; 528/34; 556/439; 556/440
(58) Field of Search ................ 528/31, 34, 26; 556/439, 440

(56) References Cited

U.S. PATENT DOCUMENTS 4,512,926 * 4/1985 Kampf et al. .......................... 260/398
5,807,922 * 9/1998 Thames et al. ....................... 524/725
6,071,977 * 6/2000 Austin et al. ......................... 521/112

FOREIGN PATENT DOCUMENTS 62-01750    2/1987  (JP) .

* cited by examiner

Primary Examiner—Margaret G. Moore
(74) Attorney, Agent, or Firm—Jennifer S. Warren

(57) ABSTRACT

An anti-staining additive comprising a higher unsaturated aliphatic acid ester-modified organosilicon compound that is produced by carrying out an addition reaction between (a) a higher unsaturated aliphatic acid ester that contains more than one aliphatically unsaturated bond in each molecule
and
(b) an organosilicon compounds that contains at least 1 silicon-bonded hydrogen atom in each molecule with the aliphatically unsaturated bonds in component (a) present in molar excess over the silicon-bonded hydrogen in component (b). The additive can be used at 0.01 to 50 weight percent in a polyorganosiloxane composition that cures at room temperature by a condensation reaction.

8 Claims, 1 Drawing Sheet

ANTI-STAINING ADDITIVE AND ROOM-TEMPERATURE-CURABLE POLYORGANOSILOXANE COMPOSITION

FIELD OF THE INVENTION

This invention relates to an anti-staining additive and to a room-temperature-curable polyorganosiloxane composition. More particularly, this invention relates to an anti-staining additive that comprises a higher unsaturated aliphatic acid ester-modified organosilicon compound and to a room-temperature-curable polyorganosiloxane composition that contains said additive. The polyorganosiloxane composition cures to give a cured product that has a staining-resistant surface and that also prevents the staining of substrate in contact with said cured product.

BACKGROUND OF THE INVENTION

Room-temperature-curable (RTC) polyorganosiloxane compositions that comprise hydroxyl-endblocked polyorganosiloxane as base component in combination with a crosslinker bearing silicon-bonded hydrolyzable groups are known in the art. These compositions are widely used as sealants, coatings, electrical insulation, and moldmaking materials. One problem associated with the application of these RTC compositions as, for example, a sealant or coating, has been the loss of aesthetics that occurs due to staining or soiling of the surface of the cured product and its surroundings. As a consequence, various additives have been proposed in order to improve the resistance of these RTC polyorganosiloxane compositions to staining. For example, Japanese Laid Open (Kokai or Unexamined) Patent Application Number Sho 62-1750 (1,750/1987) teaches an RTC polyorganosiloxane composition that contains an ester from an alcohol and an unsaturated higher aliphatic acid. Unfortunately, this ester is poorly compatible with the hydroxyl-endblocked polyorganosiloxane that is the base component of this composition. When such a composition is deployed in a one-package formulation, the ester will undergo phase separation within the container with elapsed time during storage. This results in a deterioration in storage stability and a decline in the anti-staining activity. While deployment as a two-package formulation (e.g. where base component and crosslinker are mixed just before use) does eliminate the problem of phase separation by the ester with elapsed time, with this type of formulation the ester dispersed in the polyorganosiloxane phase rather rapidly separates out in large amounts on the surface of the cured product. This prevents the long-term manifestation of anti-staining activity. Thus, there is a need for an unsaturated higher aliphatic acid ester-based anti-staining additive that is highly compatible with the polyorganosiloxane base component and that manifests an excellent anti-staining activity on a long-term basis.

An object of this invention is to provide an anti-staining additive that is highly compatible with polyorganosiloxanes and that has a long-term ability to inhibit staining of the surface of the cured product and to inhibit staining of substrate in contact with the cured product. An additional object of this invention is to provide a room-temperature-curable polyorganosiloxane composition that contains this anti-staining additive.

DETAILED DESCRIPTION OF THE INVENTION

Figure 1:
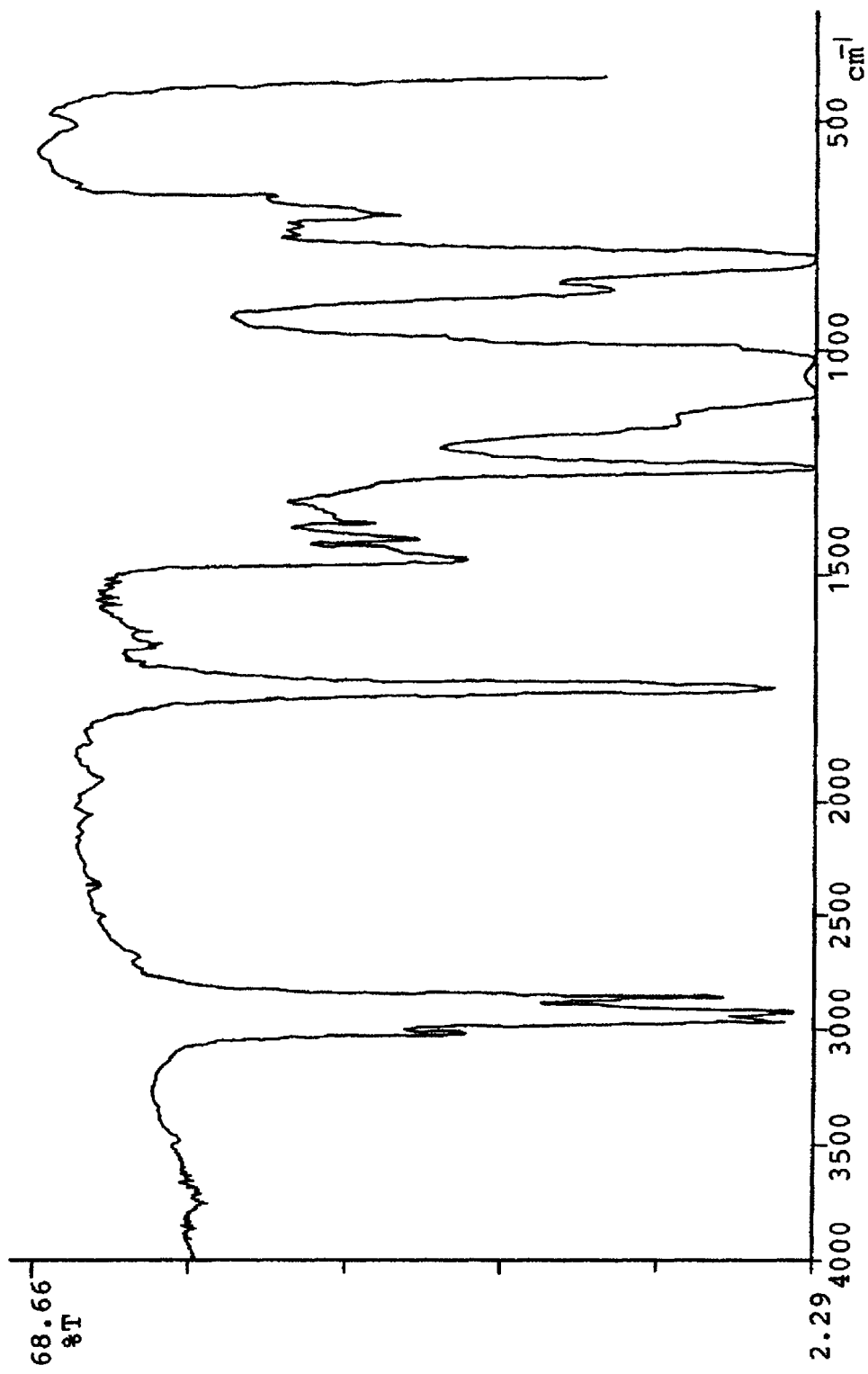
FIG. 1 contains the infrared spectra (IR) chart of the tung oil-modified polydimethylsiloxane synthesized in Reference Example 1.

This invention is an anti-staining additive that characteristically comprises the higher unsaturated aliphatic acid ester-modified organosilicon compound that is produced by carrying out an addition reaction between (a) a higher unsaturated aliphatic acid ester that contains more than one aliphatically unsaturated bond in each molecule and (b) an organosilicon compound that contains at least 1 silicon-bonded hydrogen atom in each molecule with the aliphatically unsaturated bonds in component (a) present in molar excess over the silicon-bonded hydrogen in component (b). This invention additionally is polyorganosiloxane composition that cures at room temperature by a condensation reaction and that characteristically contains from 0.01 to 50 wt. % of the aforesaid anti-staining additive.

The component (a) used for the anti-staining additive of this invention is a higher unsaturated aliphatic acid ester that contains more than one aliphatically unsaturated bond in each molecule. This is preferably an ester that contains 10 or more carbon atoms in the higher unsaturated aliphatic acid moiety. While this ester must contain at least 2 aliphatically unsaturated bonds in each molecule, there is no particular upper limit on the number of such bonds in each molecule. The positions of these bonds are not critical, and the plural number of aliphatically unsaturated bonds may be present in an isolated or conjugated configuration. Component (a) can take the form of a component whose main constituent is the aforesaid higher unsaturated aliphatic acid ester. Particularly preferred from a practical standpoint are natural oils whose main constituent is triglyceride composed of the esters of glycerol with higher unsaturated aliphatic acids that contain more than one aliphatically unsaturated bond in each molecule. These natural oils can be exemplified by tung oil, linseed oil, soybean oil, castor oil, rapeseed oil, and cottonseed oil. While these natural oils are mixtures of higher unsaturated aliphatic acid esters with saturated aliphatic acid esters, alcohols, unsaturated aliphatic acids, and saturated aliphatic acids, when used for the component (a) under consideration such mixtures must contain at least 80 wt. % of the subject higher unsaturated aliphatic acid esters. The higher unsaturated aliphatic acid ester (a) can be synthesized by a condensation reaction between an alcohol and a higher unsaturated aliphatic acid that contains more than one aliphatically unsaturated bond in each molecule. The higher unsaturated aliphatic acid can be exemplified by linoleic acid, linolenic acid, eleostearic acid, licanic acid, and arachidonic acid. The alcohol can be exemplified by monohydric alcohols such as methanol and ethanol; dihydric alcohols such as ethylene glycol and propylene glycol; trihydric alcohols such as trimethylolpropane, glycerol, and trimethylolethane; tetrahydric alcohols such as pentaerythritol; hexahydric alcohols such as sorbitol; and organosilicon compounds that contain an OH-functional organic group bonded to silicon. The use of polyhydric alcohols is preferred.

The organosilicon compound (b) used for the anti-staining additive of this invention must contain Si-bonded hydrogen and must not contain a substituent that during the addition reaction with component (a) would cause side reactions or inhibit the reaction, but otherwise there are no particular restrictions on the organosilicon compound (b). Component (b) may have a straight-chain, branched-chain, or cyclic molecular structure. In regard to the molecular weight, organosilicon compounds (b) can be used that have a number-average molecular weight within the broad range from ten to several hundred thousand. Component (b) can be exemplified by the various heretofore known organosilicon compounds, but is preferably polyorganosiloxane free of amino-, epoxy-, and OH-functional organic groups bonded to the silicon. An example in this regard is the polyorganosiloxane bearing Si—H in molecular chain terminal or pendant position as defined by the following general formula

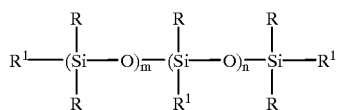

in which R denotes monovalent hydrocarbon groups, $R^1$ is the hydrogen atom or a monovalent hydrocarbon group, n is 0 or an integer with a value of at least 1, m is an integer with a value of at least 1, and m+n is an integer with a value between 1 and 20,000, inclusive.

The higher unsaturated aliphatic acid ester-modified organosilicon compound constituting the anti-staining additive of this invention is produced by addition reacting the above-defined components (a) and (b) in the presence of a hydrosilylation catalyst using a molar excess of aliphatically unsaturated bonds in (a) over silicon-bonded hydrogen in (b). Gelation of the reaction product can occur during this reaction and is related to the ratio of moles of aliphatically unsaturated bonds in (a) to moles of silicon-bonded hydrogen in (b). In particular, since the higher unsaturated aliphatic acid ester (a) contains more than one aliphatically unsaturated bond, the ratio of moles of aliphatically unsaturated bonds in (a) to moles of silicon-bonded hydrogen in (b) must be suitably controlled to avoid gelation when component (b) is an organosilicon compound containing on average more than one silicon-bonded hydrogens in each molecule. For example, the use of tung oil as component (a) and dimethylhydrogensiloxy-endblocked polydimethylsiloxane with an average degree of polymerization of 20 as component (b), gelation will occur when the ratio of moles of aliphatically unsaturated bonds in (a) to moles of silicon-bonded hydrogen in (b) is less than or equal to 5.5. Therefore, the ratio should be set under these circumstances to a value greater than 5.5.

The hydrosilylation catalyst used in the addition reaction under consideration is a catalyst that accelerates the addition reaction between aliphatically unsaturated bonds and silicon-bonded hydrogen, such as platinum group catalysts. Alcohol solutions of chloroplatinic acid and complexes between platinum and an alkenyl compound or phosphorus compound are useful as this catalyst, but non-platinum catalysts such as rhodium catalysts and palladium catalysts can also be used as the hydrosilylation catalyst under consideration. Specific examples of usable catalysts are platinum black, chloroplatinic acid, chloroplatinic acid-olefin complexes, chloroplatinic acid-alcohol coordination compounds, rhodium, and rhodium-olefin complexes. The appropriate addition of this catalyst will vary up or down as a function of the reactivities of the particular components (a) and (b) used. However, in the case of platinum and rhodium catalysts, catalyst addition preferably provides from 0.1 to 500 weight parts and more preferably from 1 to 300 weight parts platinum metal or rhodium metal for each 1,000,000 weight parts of the total of components (a) and (b). While the addition reaction under consideration can be run even at room temperature, it is preferably run at a temperature of at least 30° C. in order to obtain good reaction rates. The temperature range of 80 to 120° C. is particularly preferred. The addition reaction under consideration can be run in the presence or absence of solvent. Any solvent can be used here as long as it does not induce side reactions during the addition reaction or poison the addition reaction catalyst. Useful solvents include aromatic hydrocarbons such as benzene, toluene, and xylene; aliphatic hydrocarbons such as hexane, heptane, octane, and cyclohexane; and ethers such as tetrahydrofuran, dioxane, and diethyl ether. The natural oils that are candidates for component (a) may contain small amounts of water, in which case they are preferably dried prior to the addition reaction. This drying can be effected, for example, by mixing component (a) with hexane or toluene followed by heating in order to carry out azeotropic drying. The progress and completion of the addition reaction can be confirmed by monitoring the remaining amount of silicon-bonded hydrogen using, for example, infrared spectrochemical analysis (IR) or nuclear magnetic resonance analysis (NMR). After completion of the reaction, the desired higher unsaturated aliphatic acid ester-modified organosilicon compound can be obtained by distilling off any low boilers or solvent by heating under reduced pressure. Higher unsaturated aliphatic acid ester-modified polyorganosiloxane with a number-average molecular weight (polystyrene basis) from 900 to 100,000 is preferred for use as the higher unsaturated aliphatic acid ester-modified organosilicon compound constituting the anti-staining additive of this invention.

Since the anti-staining additive of the invention contains the polysiloxane segment, it is far more compatible with polyorganosiloxanes than the prior-art higher unsaturated aliphatic acid/alcohol esters. For example, when blended into a room-temperature-curable polyorganosiloxane composition, the additive of this invention is characteristically present in the polyorganosiloxane phase in a micro-dispersed state both before and after curing. Furthermore, the higher unsaturated aliphatic acid ester-modified organosilicon compound constituting the anti-staining additive of this invention develops an excellent anti-staining activity because its molecule contains the aliphatically unsaturated bond. Moreover, since it gradually separates out in small amounts on the surface of the cured product, this anti-staining additive offers the advantage of providing a long-term anti-staining activity. The anti-staining additive of this invention is useful for application in single-package and two-package RTC polyorganosiloxane compositions. It is also useful as an anti-staining additive for RTC silicone-modified polymer compositions such as RTC compositions based on alkoxysilyl-terminated polyoxyalkylenes and RTC compositions based on alkoxysilyl-functional polyisobutylenes.

The RTC polyorganosiloxane composition according to the present invention is an polyorganosiloxane composition that cures at room temperature by a condensation reaction and that characteristically contains from 0.01 to 50 wt. % of the above-described higher unsaturated aliphatic acid ester-modified organosilicon compound. A specific example of this composition is the RTC polyorganosiloxane composition comprising the following components:

(A) 100 weight parts polyorganosiloxane whose molecular chain terminals are endblocked by the silanol group or a silicon-bonded hydrolyzable group, (B) 0.1 to 40 weight parts crosslinker, and (C) 0.01 to 40 weight parts of the higher unsaturated aliphatic acid ester-modified organosilicon compound that is produced by carrying out an addition reaction between (a) a higher unsaturated aliphatic acid ester that contains more than one aliphatically unsaturated bond in each molecule and (b) an organosilicon compound that contains at least 1 silicon-bonded hydrogen atom in each molecule with the aliphatically unsaturated bonds in component (a) present in molar excess over the silicon-bonded hydrogen in component (b).

The component (A) used in the composition of this invention can be exemplified by a polydiorganosiloxane with the following general formula.

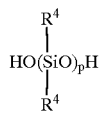

Each $R^4$ in this formula is independently selected from substituted and unsubstituted monovalent hydrocarbons and can be specifically exemplified by alkyl such as methyl, ethyl, propyl, butyl, and pentyl; alkenyl such as vinyl, allyl, methacryl, butenyl, and pentenyl; aryl such as phenyl, tolyl, and xylyl; aralkyl such as benzyl and phenethyl; and halogenated hydrocarbon groups such as trifluoropropyl, nonafluorohexyl, chloropropyl, and chloromethylphenethyl. The subscript p is an integer with a value of at least 10. In addition to this structure, the following, for example, can also be used as the polyorganosiloxane (A): polydiorganosiloxane in which one of the endblocking silanol groups in the preceding general formula has been substituted by the siloxy group $R^4_3SiO$—; silanol-endblocked polyorganosiloxane that has a partially branched structure; trialkoxysilylethylene-endblocked polydiorganosiloxane; methyldialkoxysiloxy-endblocked polydiorganosiloxane; and vinyldi(methyl ethyl ketoximo)siloxy-endblocked polydiorganosiloxane. The polyorganosiloxane (A) preferably has a viscosity (25° C.) from 25 to 500,000 mm$^2$/s and more preferably from 1,000 to 100,000 mm$^2$/s in order to maintain workability during application of the invention composition while at the same time equipping the cured product with good physical properties and particularly with flexibility and a high elongation.

The crosslinker (B) used in the composition of this invention functions to induce crosslinking of component (A) at room temperature. Typical examples of component (B) are silanes that contain at least 2 silicon-bonded hydrolyzable groups in each molecule and oligosiloxanes that contain at least 2 silicon-bonded hydrolyzable groups in each molecule. Such a silicon-bonded hydrolyzable group can be exemplified by alkoxysilyl, acyloxysilyl, N,N-dialkylaminosilyl, N-alkylamidosilyl, N,N-dialkylaminoxysilyl, ketoximosilyl, and alkenoxysilyl. Component (B) can be specifically exemplified by methyltrimethoxysilane, methyltriethoxysilane, vinyltrimethoxysilane, methylphenyldimethoxysilane, 3,3, 3-trifluoropropyltrimethoxysilane, methyltriacetoxysilane, vinyltriacetoxysilane, ethyltris(N,N-diethylamino)silane, vinyltris(N-methyl-N-cyclohexylamino)silane, dimethylbis (N,N-dibutylamino)silane, methyltris(N-methylacetamido) silane, methylvinylbis(N-ethylacetamido)silane, methyltris (N,N-diethylaminoxy)silane, phenyltris(N,N-diethylaminoxy)silane, methyltris(methyl ethyl ketoximo) silane, vinyltris(methyl ethyl ketoximo)silane, 3,3,3-trifluoropropyltris(methyl ethyl ketoximo)silane, methyltris (isopropenoxy)silane, vinyltris(isopropenoxy)silane, ethyl polysilicate, n-propyl orthosilicate, dimethyltetraacetoxydisiloxane, tetramethylmonoethyltris (N,N-diethylaminoxy)cyclotetrasiloxane, pentamethyltris (N,N-diethylaminoxy)cyclotetrasiloxane, and hexamethylbis(N,N-diethylaminoxy)cyclotetrasiloxane. Component (B) can be a single silane, or oligosiloxane bearing 2, 3, 4, or more silicon-bonded hydrolyzable groups, or can be a mixture of these compounds. Component (B) should be added in an amount such that the moles of silicon-bonded hydrolyzable group in component (B) are greater than or equal to moles of silanol group or silicon-bonded hydrolyzable group in component (A). Preferably, component (B) will be added at from 0.1 to 40 weight parts and preferably at from 1 to 20 weight parts, in each case per 100 weight parts component (A). At less than 0.1 weight part (B) per 100 weight parts (A), gelation is prone to occur during production and storage of the curable composition, and curing may not give a cured product with the desired properties. The use of more than 40 weight parts (B) per 100 weight parts (A) may cause problems such as a large shrinkage during cure, slow cure, and reduced elasticity on the part of the cured product.

The anti-staining additive component (C) used in the invention composition is the higher unsaturated aliphatic acid ester-modified organosilicon compound already described above. Component (C) is used at from 0.01 to 40 weight parts and preferably at from 0.1 to 20 weight parts, in each case per 100 weight parts component (A). An acceptable anti-staining activity cannot be imparted to the surface of the cured product with the use of less than 0.01 weight part component (C), while the use of more than 40 weight parts results in such problems as a slow cure and a reduction in the elasticity of the cured product.

While the composition of this invention comprises the components (A), (B), and (C) as described above, it may also contain a cure-accelerating catalyst. This catalyst can be exemplified by metal carboxylates such as dibutyltin diacetate, dibutyltin dioctoate, dibutyltin dilaurate, cobalt naphthoate, tin octoate, iron octoate, and manganese octoate; metal alcoholates such as tetrabutyl titanate, tetraisopropyl titanate, bis(acetylacetonate)diisopropyl titanate, and tetrabutyl zirconate; and amine compounds such as guanidine. The composition of this invention may also contain the following as necessary or desired: fillers such as fumed silica, hydrophobicized fumed silica, hydrophobicized precipitated silica, quartz micropowder, diatomaceous earth, calcium carbonate, and carbon black; pigments such as iron oxide red, titanium dioxide, zinc white, ultramarine blue, iron black, and carbon black; as well as a nonsag agent, antibacterial agent, organic solvent, surfactant, antimold, antimicrobial, and drying oil.

The composition of this invention can be prepared simply by mixing components (A), (B), and (C) along with any optional components to homogeneity. The composition of this invention is used preferably after a defoaming step, which may be carried out during or after mixing.

The RTC polyorganosiloxane composition of this invention as described above, because it contains the specified higher unsaturated aliphatic acid ester-modified organosilicon compound as its anti-staining additive, is characterized by an excellent compatibility among its various components. As a result, this composition does not suffer from a loss of anti-staining activity even when its one-package formulation is subjected to long-term storage prior to cure. Moreover, because the anti-staining additive gradually bleeds out after curing, substrate in contact with the cured product and the surface of the cured product itself are provided with long-term protection from staining and soiling. These advantageous features make the RTC polyorganosiloxane composition of this invention very well suited for application as a sealant or coating.

The anti-staining additive according to the present invention, because it is an organosilicon compound with the special structure described above, is highly compatible with polyorganosiloxanes and also develops an excellent anti-staining activity. The room-temperature-curable polyorganosiloxane composition according to the present invention, which contains this anti-staining additive, provides long-term resistance to staining of the surface of the cured product afforded by the composition and long-term resistance to staining of substrate in contact with this cured product. This performance is obtained because the anti-staining additive according to the present invention separates out gradually in small amounts on the surface of the cured product.

EXAMPLES

The invention will be explained in greater detail below through working examples. The viscosity values reported in the examples were measured at 25° C.

Reference Example 1

5.4 g tung oil (78 wt. % α-eleostearic acid, 9 wt. % linoleic acid, 9 wt. % oleic acid, and 4 wt. % saturated aliphatic acids), 5 g dimethylhydrogensiloxy-endblocked polydimethylsiloxane with an average degree of polymerization of 20, and 10 ml toluene were introduced into a stirrer-equipped four-neck flask. The water in the mixture was subsequently removed by azeotropic drying for 30 minutes. After drying the ratio of moles of aliphatically unsaturated bonds to moles of silicon-bonded hydrogen in the mixture was 9. The temperature was then set to 90° C. and sufficient platinum complexed with 1,3-divinyltetramethyldisiloxane was introduced to provide 10 ppm platinum metal calculated on the sum of the tung oil and polydimethylsiloxane. Introduction of the complex was followed by stirring for 2 hours while heating at 90 to 100° C. After this 2 hour period the reaction mixture was sampled and analyzed by infrared absorption spectroscopic analysis (IR), it was found that the absorption characteristic of silicon-bonded hydrogen had disappeared and thus that the reaction was complete. The IR spectra is displayed in FIG. 1. Distillation of the low boilers by heating gave 9.7 g of a transparent liquid. Analysis of this liquid by IR, NMR, and gel permeation chromatography (GPC) showed it to be a mixed solution of 14 wt. % unreacted tung oil and 86 wt. % polydimethylsiloxane modified by tung oil at both terminals (composition by GPC area ratio). This tung oil-modified polydimethylsiloxane had a number-average molecular weight (polystyrene basis) of 13,059 and a polydispersity in its molecular weight distribution of 1.66.

Example 1

0.34 g of the tung oil-modified polydimethylsiloxane mixed solution synthesized in Reference Example 1 was mixed into 7.5 g silanol-endblocked polydimethylsiloxane with a viscosity of 80 mPa·s. The appearance of the resulting mixture was visually evaluated: the mixture presented a white turbidity but was somewhat transparent. After this mixture had been allowed to stand for 3 days at room temperature, its appearance was almost entirely unchanged from that of the unaged mixture.

Comparative Example 1

0.34 g of tung oil was mixed into 7.5 g silanol-endblocked polydimethylsiloxane with a viscosity of 80 mPa·s. The appearance of the resulting mixture was visually evaluated: in this case the mixture presented a pure white turbidity and the transparency seen in Example 1 was entirely absent. This mixture was then held for 3 days at room temperature, after which period it was observed that the tung oil had undergone complete phase separation from the polydimethylsiloxane and had formed large oil drops.

Example 2

The following were blended into 100 parts silanol-endblocked polydimethylsiloxane (viscosity=10,000 mPa·s) to give a single-component RTC polyorganosiloxane composition: 6 parts methyltris(methyl ethyl ketoximo)silane, 2 parts vinyltris(methyl ethyl ketoximo)silane, 0.2 part dibutyltin dilaurate, 80 parts aliphatic acid-treated calcium carbonate with an average particle size of 0.08 $\mu$m (Hakuenka CCR from Shiraishi Kogyo Kaisha, Ltd.), 1 part imidazole-type antimold, and 3 parts of the tung oil-modified polydimethylsiloxane mixed solution synthesized in Reference Example 1. The resulting composition was filled into the gap between two boards of Glasal (from Toray Glasal Corp., dimensions=150 mm×340 mm×10 mm) and cured to prepare a test specimen (the gap between the two Glasal boards was 20 mm). The test specimen was then held outdoors for 6 months. This holding period was followed by inspection for the appearance of any staining on the surface of the cured product and in the regions surrounding the cured product. Absolutely no staining was observed even after passage of the 6-month holding period.

Example 3

The following were blended into 100 parts silanol-endblocked polydimethylsiloxane (viscosity=10,000 mPa·s) to give an RTC polyorganosiloxane composition: 100 parts aliphatic acid-treated calcium carbonate with an average particle size of 0.08 $\mu$m (Hakuenka CCR from Shiraishi Kogyo Kaisha, Ltd.), 8 parts tetrapropoxysilane as crosslinker, 0.08 part dibutyltin dilaurate, 1 part imidazole-type antimold, and 3 parts of the tung oil-modified polydimethylsiloxane mixed solution synthesized in Reference Example 1. Using the resulting composition, a test specimen was prepared as described in Example 2. The test specimen was then held outdoors for 6 months. This holding period was followed by inspection for the appearance of any staining on the surface of the cured product and in the regions surrounding the cured product. Absolutely no staining was observed even after passage of the 6-month holding period.

Comparative Example 2

The following were blended into 100 parts silanol-endblocked polydimethylsiloxane (viscosity=10,000 mPa·s) to give a single-component RTC polyorganosiloxane composition: 6 parts methyltris(methyl ethyl ketoximo)silane, 2 parts vinyltris(methyl ethyl ketoximo)silane, 0.2 part dibutyltin dilaurate, 80 parts aliphatic acid-treated calcium carbonate with an average particle size of 0.08 $\mu$m (Hakuenka CCR from Shiraishi Kogyo Kaisha, Ltd.), and 1 part imidazole-type antimold. Using the resulting composition, a test specimen was prepared as described in Example 2. This test specimen was then held outdoors as described for the test specimen in Example 2. After about one month, staining had developed on the surface of the cured product; after two about months, streak-like staining had developed on the surface of the Glasal boards.

Comparative Example 3

The following were blended into 100 parts silanol-endblocked polydimethylsiloxane (viscosity=10,000 mPa·s)

to give an RTC polyorganosiloxane composition: 100 parts aliphatic acid-treated calcium carbonate with an average particle size of 0.08 μm (Hakuenka CCR from Shiraishi Kogyo Kaisha, Ltd.), 1 part imidazole-type antimold, 8 parts tetrapropoxysilane as crosslinker, and 0.08 part dibutyltin dilaurate. Using the resulting composition, a test specimen was prepared as described in Example 3. The test specimen was then held outdoors as described for the test specimen in Example 3. After about one month, staining had developed on the surface of the cured product; after about two months, streak-like staining had developed on the surface of the Glasal boards.

What is claimed is:

1. An unsaturated aliphatic acid ester-modified organosilicon compound that is produced by carrying out an addition reaction between
    (a) a higher unsaturated aliphatic acid ester having 10 or more carton atoms that contains more than one aliphatically unsaturated bond in each molecule
    and
    (b) a polyorganosiloxane that contains at least 1 silicon-bonded hydrogen atom in each molecule
where the aliphatically unsaturated bonds in component (a) present in molar excess over the silicon-bonded hydrogen in component (b).

2. The higher unsaturated aliphatic acid ester-modified organosilicon compound described in claim 1, in which component (a) is a natural oil selected from tung oil, linseed oil, soybean oil, castor oil, rapeseed oil, and cottonseed oil.

3. A polyorganosiloxane composition that cures at room temperature by a condensation reaction, comprising from 0.01 to 50 wt. % of an unsaturated aliphatic acid ester-modified organosilicon compound as produced by an addition reaction between
    (a) an unsaturated aliphatic acid ester having 10 or more carbon atoms that contains more than one aliphatically unsaturated bond in each molecule
    and
    (b) a polyorganosiloxane that contains at least 1 silicon-bonded hydrogen atom in each molecule
with the aliphatically unsaturated bonds in component (a) present in molar excess over the silicon-bonded hydrogen in component (b).

4. The room-temperature-curable polyorganosiloxane composition of claim 3, comprising
    (A) 100 weight parts silanol-endblocked polyorganosiloxane,
    (B) 0.1 to 40 weight parts crosslinker,
    and
    (C) 0.01 to 40 weight parts of the higher unsaturated aliphatic acid ester-modified organosilicon compound that is produced by carrying out an addition reaction between
        (a) a higher unsaturated aliphatic acid ester having 10 or more carbon atoms that contains more than one aliphatically unsaturated bond in each molecule
        and
        (b) a polyorganosiloxane that contains at least 1 silicon-bonded hydrogen atom in each molecule with the aliphatically unsaturated bonds in component (a) present in molar excess over the silicon-bonded hydrogen in component (b).

5. The room-temperature-curable polyorganosiloxane composition of claim 3 in which component (a) is a natural oil selected from the group consisting of tung oil, linseed oil, soybean oil, castor oil, rapeseed oil, and cottonseed oil.

6. The room-temperature-curable polyorganosiloxane composition of claim 4 in which component (a) is a natural oil selected from the group consisting of tung oil, linseed oil, soybean oil, castor oil, rapeseed oil, and cottonseed oil.

7. The room-temperature-curable polyorganosiloxane composition described in claim 3 in which component (b) is a polyorganosiloxane having silicon-bonded hydrogen in pendant or molecular chain terminal position.

8. The room-temperature-curable polyorganosiloxane composition described in claim 4 in which component (b) is a polyorganosiloxane having silicon-bonded hydrogen in pendant or molecular chain terminal position.

* * * * *